Patented Oct. 4, 1932

1,881,253

UNITED STATES PATENT OFFICE

GEOFFREY WILLIAM TROBRIDGE, OF SUTTON COLDFIELD, ENGLAND, ASSIGNOR TO DUNLOP RUBBER COMPANY LIMITED, OF BIRMINGHAM, ENGLAND, A BRITISH CORPORATION

METHOD OF MANUFACTURING RUBBER ARTICLES

No Drawing. Application filed August 3, 1929, Serial No. 383,423, and in Great Britain October 11, 1928.

This invention has for its object the production of ornamental articles of rubber comprising in their finished state at least two pieces of rubber of different colours integrally united with one another.

According to one embodiment of the invention a mould or former may be provided with a coating of an aqueous dispersion or solution of rubber of one colour and then another coating of an aqueous dispersion or solution of rubber of another colour may be applied to the first coating whereafter the whole is dried and vulcanized.

According to another embodiment of the invention a mould or former provided with grooves or indentations representing any desired pattern or being embossed may have the grooves or indentations or embossed parts filled or covered with at least one coloured aqueous dispersion or solution of rubber and then be coated or covered with an aqueous dispersion or solution of rubber of another colour whereafter the whole is dried and vulcanized.

In this manner extremely pretty colour effects can be secured. Thus for example tobacco pouches may be made so that while the pouch itself is of one colour it contains a medallion of another colour, said medallion including if desired a representation, for example a face of the same colour or some other colour.

The first coating may be applied to the mould or former by for example painting, printing, spreading or spraying while the second coating may be applied by dipping (involving if desired for example the use of suction, or coagulants or a combination of suction and coagulants) or by spreading, spraying or electrophoretic deposition.

Examples of the aqueous dispersions containing organic materials are natural or artificial dispersions of rubber, gutta-percha, balata or the like vegetable resins which if required may be in a preserved, compounded or concentrated condition. The aqueous dispersions may, if desired, contain such added substances as factice, rubber waste, rubber reclaim, mineral rubber or synthetic rubber, vulcanizing agents, accelerators, additional preservatives, dyes and filling materials of the ordinary type as well as such special materials as leather dust, cork dust, fibres, metal dust and colloidal metals. Such dispersions may also have admixed therein such artificial resins as phenolaldehyde, protein-aldehyde and/or urea-aldethyde condensation products.

The coloured bases can be prepared from any one or more of the above-mentioned aqueous dispersions having admixed therein the different colours.

One example of carrying the invention into effect is as follows:—A non-porous shape or former is coated as by painting, printing, spreading, spraying or a combination of two or more of these methods with a latex having a water content of approximately 40% and the alkalinity approximately 0.05 grams ammonia per 100 cc. and a solid content of the following composition:—

| | Parts by weight |
|---|---|
| Rubber | 100 |
| Sulphur | 2 |
| Transformer oil | 5 |
| Zinc diethyldithic-carbamate | 1 | having admixed therein the necessary pigments or organic or inorganic colours. The former with the one colour or variegated deposit of rubber thus produced is heated to about 90° C. and then dipped into a bath containing a latex of the above composition and then withdrawing the shape or former with its deposits.

The rubber deposits so obtained are dried and stripped from the former then turned inside out and subsequently vulcanized in an oven at 100° C. for one hour.

In this manner an article of rubber is obtained wherein a one-colour or variegated deposit of rubber has become bonded to the main deposit of rubber.

If desired a former bearing an engraved or embossed pattern can be employed in certain grooves or depressions of which one or more particular coloured rubber mixings can be painted or spread. These grooves or depressions can be of varying depth and in this way there may be obtained articles of rubber having transferred thereon one or more coloured transfers of varying thicknesses.

The expression "rubber" is intended for the purpose of this invention to include gutta-percha, balata, and other analogous vegetable resins.

Various modifications may be made by those skilled in the art without departing from the invention as defined in the appended claims.

What I claim is:

1. A method of forming ornamented articles of rubber which comprises depositing in a local design on a former a dispersed material of one color from an aqueous dispersion of rubber and then depositing on said former dispersed material from an aqueous dispersion of rubber of different color to form a backing for said design on said first deposit, and vulcanizing said deposits to a unitary rubber structure.

2. A method of forming ornamented articles of rubber which comprises depositing in the grooves of an embossed former a deposit of dispersed material of one color from an aqueous dispersion of rubber, drying said deposit, depositing a backing of rubber of different color from an aqueous dispersion thereof, drying said deposits, turning the formed deposit inside out, and vulcanizing the latter.

In witness whereof, I have hereunto signed my name.

GEOFFREY WILLIAM TROBRIDGE.